UNITED STATES PATENT OFFICE.

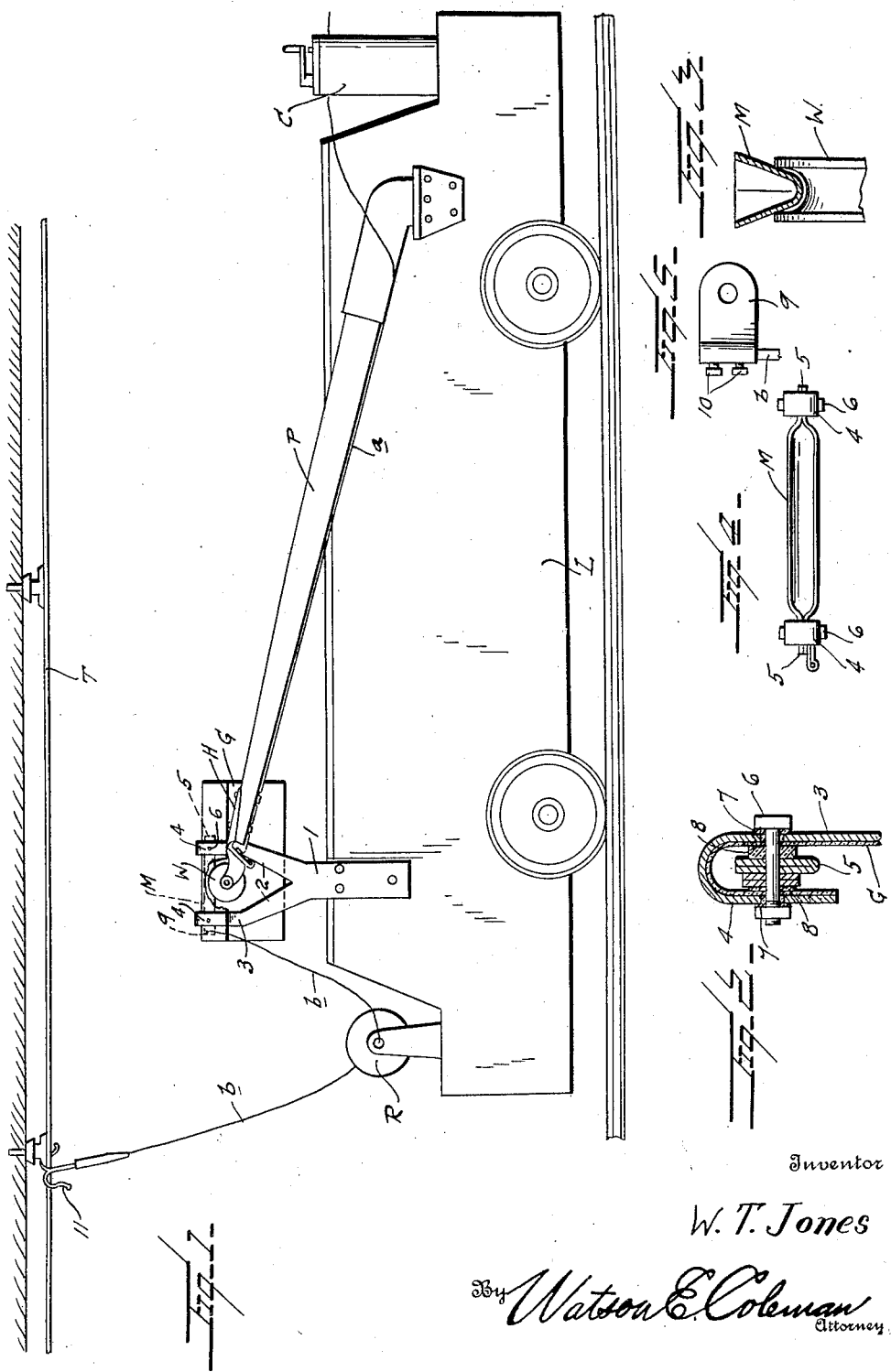

WILLIAM THOS. JONES, OF PANTHER, WEST VIRGINIA.

SAFETY TRANSFER-CABLE REEL AND TROLLEY-POLE SWITCH.

1,408,601.   Specification of Letters Patent.   Patented Mar. 7, 1922.

Application filed November 16, 1921. Serial No. 515,575.

*To all whom it may concern:*

Be it known that I, WILLIAM T. JONES, a citizen of the United States, residing at Panther, in the county of McDowell and State of West Virginia, have invented certain new and useful Improvements in Safety Transfer-Cable Reels and Trolley-Pole Switches, of which the following is a specification, reference being had to the accompanying drawings.

This invention relates to a safety transfer cable reel and trolley pole switch and has relation more particularly to a mechanism of this general character especially designed and adapted for use in connection with a gathering locomotive for a mine, and it is an object of the invention to provide novel and improved means whereby the trolley pole, when lowered into an inoperative position, serves to make an electrical connection between the controller of the locomotive and the cable or conductor associated with the reel.

Another object of the invention is to provide a novel and improved mechanism of this general character whereby the cable or conductor associated with the reel of the gathering locomotive is placed in electrical connection with the controller of the locomotive when the trolley pole is moved into an inoperative position with respect to the trolley wire, together with means for housing such connection with the trolley pole so that an occupant of the locomotive is protected against shock.

The invention consists in the details of construction and in the combination and arrangement of the several parts of my improved safety transfer cable reel and trolley pole switch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation illustrating a safety transfer cable reel and trolley pole switch constructed in accordance with an embodiment of my invention, said figure being of a somewhat diagrammatic character;

Figure 2 is an enlarged transverse sectional view taken through the stationary contact member carried by the locomotive;

Figure 3 is a sectional view taken through the central portion of the stationary contact member, an associated trolley wheel being indicated in fragment;

Figure 4 is a view in top plan of the stationary contact member; and

Figure 5 is a view in side elevation of a clip for use to place the cable reel or conductor in electrical connection with the stationary contact member.

As disclosed in the accompanying drawings, L denotes a gathering locomotive of a conventional type and which includes the controller C whereby the travel of the locomotive is regulated. The locomotive L is provided with the trolley pole P having a wheel W adapted to coact in a conventional manner with the trolley wire T. The wheel W is in electrical connection with the controller C in a conventional manner through the instrumentality of the conductor $a$.

Suitably secured to the locomotive L, preferably adjacent the rear thereof, is an upstanding member 1 having its upper portion provided with the diverging arms 2 terminating in the vertically disposed extensions 3 arranged in parallelism. Each of the extensions 3 is continued by a returned portion 4 substantially in parallelism with the adjacent extension 3.

M denotes an elongated stationary contact member substantially V-shaped in form in cross section throughout the major portion of its length with its opposite end portions flattened, as at 5. Each flattened portion 5 of the member M is disposed between the extension 3 of an arm 2 and an adjacent overlying portion 4 and disposed through the extension 3, the flattened portion 5 and said portion 4 is a clamping bolt 6. The portions of the bolt 6 disposed through the extension 3 and the portion 4 are insulated by the bushings or sleeves 7 and also by the washers 8 surrounding the bolt 6 and positioned at opposite sides of the flattened portion 5.

9 denotes a clip through which one of the bolts 6 passes, said clip being interposed between a flattened portion 5 of the member M and an insulating washer 8 and in close contact with the portion 5 of the member M so that said clip 9 is in electrical connection with the member M.

$b$ denotes a cable or conductor having one end portion in electrical connection, as at 10, with the clip 9 and which cable $b$ is associated in a conventional manner with the reel R. The outer or free end portion of the cable or conductor $b$ is provided with the hook 11 which is adapted to be engaged, as is well known, with the trolley wire T.

When the trolley pole P is lowered into an inoperative position, it is caused to engage from below the member M whereby the cable or conductor $b$ is placed in electrical connection with the controller C. This is of particular advantage in view of the fact that when the cable or conductor $b$ is in use, it is unnecessary to employ any switches or other mechanism to effect the desired delivery of the current from the wire T to the motor of the locomotive and also provides means whereby the travel of the locomotive, with the use of the cable or conductor $b$, is under control of the controller C.

In order that an occupant of the locomotive will not be injured by contact with the member M or the trolley head H and the wheel W, I provide a protecting or guard plate G which is secured to the inner faces of the portions 8 and extensions 3 and also the arms 2, said plate being of such dimensions as to reduce to a minimum the possibility of contact with the member M or the associated parts of the pole P when the wheel W is in electrical contact with the member M.

By having the major portion of the member M substantially V-shaped in cross section, or more particularly that portion of the member with which the wheel W contacts, is of importance in view of the fact that the flanges of the wheel will contact with the side walls of the member M, as is particularly illustrated in Figure 1, and whereby the requisite electrical connection between the wheel W and the member M is assured, with the possibility of such connection burning out or otherwise becoming ineffective substantially eliminated.

From the foregoing description it is thought to be obvious that a safety transfer cable reel and trolley pole switch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the controller of an electric locomotive and a feed line, a trolley pole carried by the locomotive and provided with a wheel in electrical connection with the controller, a contact member carried by the locomotive, and a flexible conductor electrically connected with the contact member and adapted to be electrically engaged with the feed line, the wheel of the trolley pole being engaged with the contact member when the trolley pole is in inoperative position.

2. In combination with the controller of an electric locomotive and a feed line, a trolley pole carried by the locomotive and provided with a wheel in electrical connection with the controller, a contact member carried by the locomotive, and a flexible conductor electrically connected with the contact member and adapted to be electrically engaged with the feed line, the wheel of the trolley pole engaging the contact member from below when the pole is in an inoperative position.

3. In combination with the controller of an electric locomotive and a feed line, a trolley pole carried by the locomotive and provided with a wheel in electrical connection with the controller, a contact member carried by the locomotive, a flexible conductor electrically connected with the contact member and adapted to be electrically engaged with the feed line, the wheel of the trolley pole being engaged with the contact member when the trolley pole is in inoperative position, the portion of the contact member with which the wheel of the trolley pole engages being substantially V-shaped in cross section.

4. In combination with the controller of an electric locomotive and a feed line, a trolley pole carried by the locomotive and provided with a wheel in electrical connection with the controller, a contact member carried by the locomotive, a flexible conductor electrically connected with the contact member and adapted to be electrically engaged with the feed line, the wheel of the trolley pole being engaged with the contact member when the trolley pole is in an inoperative position, and a protecting plate disposed over the contact member and the coacting portions of the trolley pole when the wheel is in engagement with the contact member.

In testimony whereof I hereunto affix my signature.

WILLIAM THOS. JONES.